(12) United States Patent
Young

(10) Patent No.: US 7,324,121 B2
(45) Date of Patent: Jan. 29, 2008

(54) ADAPTIVE MANIPULATORS

(75) Inventor: Mark J. Young, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 247 days.

(21) Appl. No.: 10/894,775

(22) Filed: Jul. 20, 2004
(Under 37 CFR 1.47)

(65) Prior Publication Data
US 2005/0057579 A1  Mar. 17, 2005

Related U.S. Application Data

(60) Provisional application No. 60/488,833, filed on Jul. 21, 2003.

(51) Int. Cl.
*G06T 17/40* (2006.01)

(52) U.S. Cl. ............... 345/689; 345/650; 345/653; 345/661; 345/664; 345/676; 345/679

(58) Field of Classification Search .......... None
See application file for complete search history.

(56) References Cited

U.S. PATENT DOCUMENTS 5,513,303 A * 4/1996 Robertson et al. .......... 345/419
5,588,098 A * 12/1996 Chen et al. ................. 345/653
5,737,555 A * 4/1998 Gregg et al. ............... 715/856
6,426,745 B1 * 7/2002 Isaacs et al. ................ 345/419

FOREIGN PATENT DOCUMENTS

GB        2380382 A       4/2003
WO     WO 01/13337 A1    2/2001

* cited by examiner

*Primary Examiner*—Mark Zimmerman
*Assistant Examiner*—Andrew Yang
(74) *Attorney, Agent, or Firm*—Patterson & Sheridan, LLP

(57) ABSTRACT

A method of repositioning a manipulator in relation to a viewport is provided in a system for interacting with a three-dimensional object configured with a manipulator. The object and the manipulator are drawn in the viewport and the position of the manipulator is constrained to lie along the viewing axis between the viewport and the object. The manipulator is represented by a geometry corresponding to the function of the manipulator. The position of the manipulator is modified as needed so that it is not obscured by other objects in the scene. Furthermore, the position of the manipulator is modified as needed following a rotation or scaling operation so that it is oriented for ease of selection by a user.

20 Claims, 17 Drawing Sheets

ADAPTIVE MANIPULATORS

CROSS-REFERENCE TO RELATED APPLICATIONS

This application claims benefit of U.S. provisional patent application Ser. No. 60/488,833, filed Jul. 21, 2003, which is herein incorporated by reference.

BACKGROUND OF THE INVENTION

1. Field of the Invention

The present invention relates to a system and method for adapting a three-dimensional object manipulator in a three-dimensional scene configured with a viewport.

2. Description of the Related Art

Systems are known with which to create and interact with three-dimensional objects or groups thereof. Artists may use such systems to create and interact with a character object, or architects may use such systems to create and interact with building objects, or engineers may use such systems to create and interact with machinery and/or parts objects. In each instance, the above interactive process of creating and interacting with three-dimensional objects or groups thereof is known to those skilled in the art as 3D object modeling. An example of such a system is 3D Studio Max™ provided by Discreet Inc. of San Francisco, Calif.

At any time during the modeling process, interaction with 3D objects is performed by way of one or a plurality of manipulators, which may be centred upon an object geometric centre also known to those skilled in the art as the object pivot, having a geometry mirroring the object geometric axes. The interaction includes selecting a manipulator or portion thereof with manually operated input means, wherein a user then imparts two-dimensional movement to the means. The two-dimensional input data is then processed by the system for translating, rotating, scaling or a combination thereof of the object according to the selected manipulator geometry: the 3D object is thus transformed within the scene. All of the above modeling process is performed through a viewport of the system, which is a two-dimensional window into the three-dimensional volume, or scene, within which the object is defined and represented and onto which the portion of the scene intersecting the viewport frustum is rasterized.

In known systems, a manipulator's respective geometry is tied to an object geometric axis. This constraining is advantageous to the user because it allows for the accurate representation of the object attitude, or pose, within the scene, such that the user may accurately transform the object according to the required modeling output. A problem however arises out of the fixed viewing axis of the viewport frustum, in that certain interactions with the object may result in the transformation of the object, e.g. its geometry, whereby the three-dimensional axes of the object become oriented away from the viewing axis or, alternatively, the object becomes positioned behind another object within the scene along the viewing axis. The resulting updated rasterization of the manipulator geometry thus becomes either confusing to the user or altogether obscured within the viewport.

Having regard to the complexity of certain scenes numbering hundred or even thousands of objects, as well as the modeled intricacy of some objects, performing such adjustments to facilitate manipulator selection for object interaction severely hampers a user's workflow and thus unnecessarily increases the cost of modeling 3D object.

SUMMARY OF THE INVENTION

The present invention is a method of repositioning a manipulator for ease of selection and ease of interaction for the purpose of manipulating a three-dimensional object displayed in a viewport. The object and the manipulator are drawn in the viewport and the position of the manipulator is constrained to lie along the viewing axis between the viewport and the object. The manipulator is represented by a geometry corresponding to the function of the manipulator. The position of the manipulator is modified as needed so that it is not obscured by other objects in the scene. Furthermore, the position of the manipulator is modified as needed following a rotation or scaling operation so that it is oriented for ease of selection by a user.

Various embodiments of a method of the invention include drawing an object in a viewport, where the object is configured with a pivot positioned at the geometric center of the object, drawing a manipulator in the viewport, transforming the object responsive to user input to produce a transformed object, drawing the transformed object in the viewport, and repositioning the manipulator in accordance with the transformed object and a constraint to produce a repositioned manipulator that is not obscured by the transformed object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
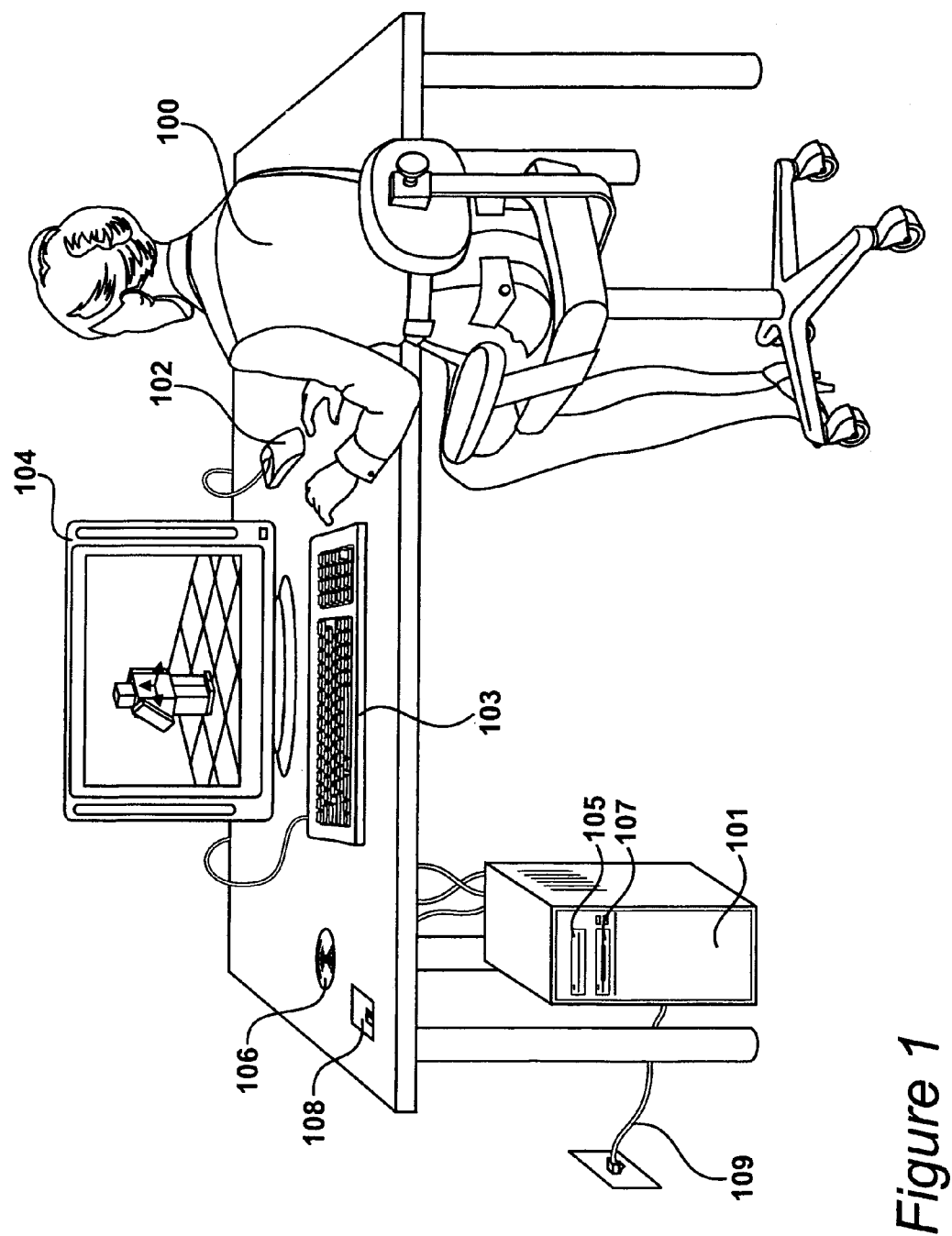
FIG. 1 shows a system for interacting with three-dimensional objects, according to one embodiment of the present invention.

FIG. 1 shows a system for interacting with three-dimensional objects, including a video display unit, according to one embodiment of the present invention.

In the system shown in FIG. 1, instructions are executed upon a graphics workstation operated by an artist 100, the architecture and components of which depends upon the level of processing required and the size of objects being considered. Examples of graphics-based processing systems that may be used for very-high-resolution work include an ONYX II manufactured by Silicon Graphics Inc, or a multiprocessor workstation 101 manufactured by IBM Inc.

The processing system 101 receives motion data from artist 100 by means of a first user data input device 102 which, in the example, is a mouse. The processing system 101 also receives alphanumerical data from artist 100 by means of another user data input device 103 which, in the example, is a computer system keyboard of a standard alpha numeric layout. The processing system 101 receives motion and alphanumerical data inputted by user 100 in response to visual information received by means of a visual display unit 104. The visual display unit 104 displays images including three-dimensional objects, menus and a cursor and movement of the cursor is controlled in response to manual operation of the user input device 102.

The processing system 101 includes internal volatile memory in addition to non-volatile bulk storage. System 101 includes an optical data-carrying medium reader 105 to allow executable instructions to be read from a removable data-carrying medium in the form of an optical disk 106, for instance a DVD-ROM. In this way, executable instructions are installed on the computer system for subsequent execution by the system. System 101 also includes a magnetic data-carrying medium reader 107 to allow object properties and data to be written to or read from a removable data-carrying medium in the form of a magnetic disk 108, for instance a floppy-disk or a ZIP™ disk.

System 101 is optionally connected to a Gigabit-Ethernet network 109 to similarly allow executable instructions and object properties and/or data to be written to or read from a remote network-connected data storage apparatus, for instance a server or even the Internet.

Figure 2:
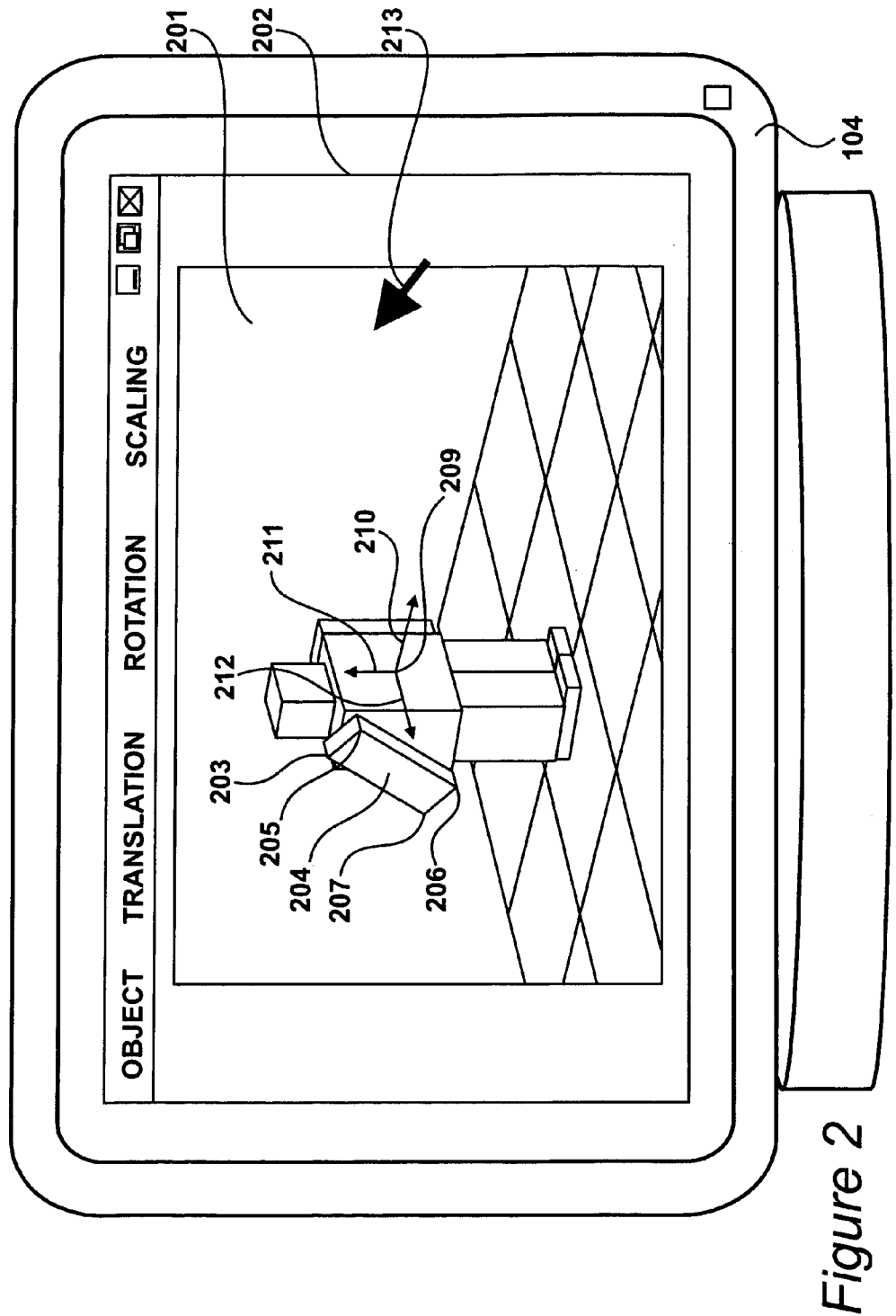
FIG. 2 illustrates a three-dimensional object configured with manipulators within a scene, processed by the system shown in FIG. 1 configured with a viewport, according to one embodiment of the present invention.

FIG. 2 illustrates an example of a three-dimensional object processed with system 101 and interacted therewith by user 100, according to one embodiment of the present invention.

A volume 201 is shown in a viewport 202 displayed on the Liquid Crystal Display (LCD) component of VDU 104. The volume 201 is known to those skilled in the art as a scene and is configured by system 101 with a x, y and z three-dimensional orthogonal reference co-ordinate system (RCS): the height of the scene is defines by a vertical axis (Y), the breadth of the scene is defined by a longitudinal axis (X) and the depth of the scene is defined by a transversal axis (Z). The portion of volume 201 observable within the view frustrum of viewport 202 is rasterized in two x, y dimensions for output to VDU 104.

A character is defined with system 101 as a plurality of vertices having respective x, y and z co-ordinates, such as vertex 203, within volume 201. The vertices define polygons, such as polygon 204 defined by vertices 203, 205, 206 and 207, the grouping of which defines a three-dimensional object, in the example a humanoid shape 208. Object 208 is itself configured with a x, y and z three-dimensional orthogonal reference co-ordinate system (RCS), wherein the geometrical centre, or pivot 209 of the object is the origin (0, 0, 0) of the object orthogonal RCS: the height of the object defines a vertical axis (Y), the breadth of the object defines a longitudinal axis (X) and the thickness of the object defines a transversal axis (Z). The transformation by means of rotation, scaling and/or translation of object 208 within volume 201 may thus be performed either in relation to the scene orthogonal RCS or the object orthogonal RCS itself.

In order to facilitate the transformation, a variety of transformation-specific manipulators may be selected by user 100 and interacted therewith. In the example, user 100 only requires to translate object 208 within volume 201, therefore a representation of appropriate manipulators is provided, centred upon the pivot 209. The geometry of the manipulators respectively includes a longitudinal axis 210, a vertical axis 211 and a transversal axis 212, thus mirroring the object orthogonal RCS. Selection by user 100 of any of the manipulator axes 210, 211, 212 with a pointer 213 activated by mouse 102 and subsequent input of two-dimensional motion data upon the mouse 102 results in the input data being processed by system 101 for translating the geometry of object 208 in relation to the selected manipulator orthogonal axis to the extent of the motion data.

Figure 3:
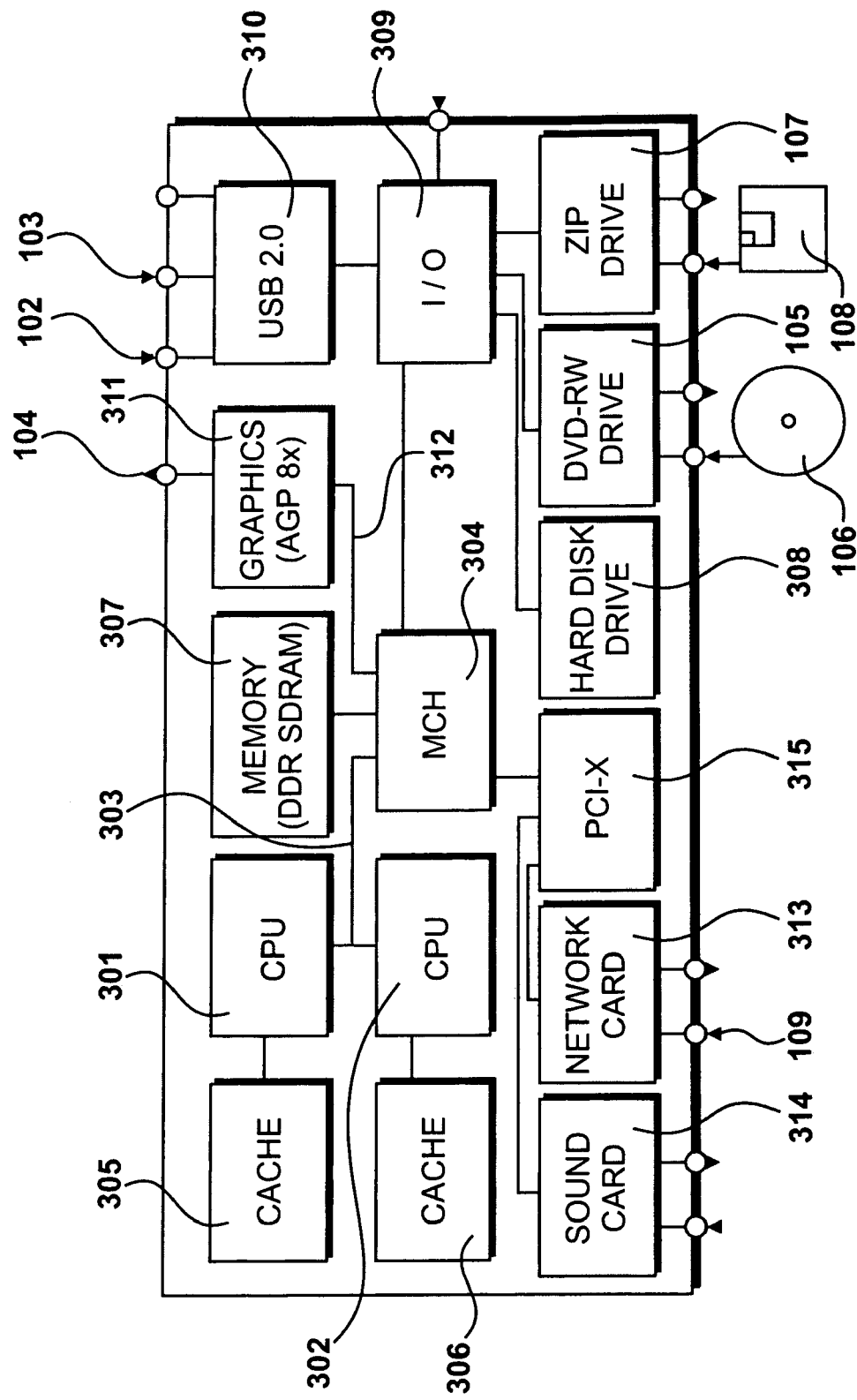
FIG. 3 details the hardware components of the computer system shown in FIGS. 1 and 2, including a memory, according to one embodiment of the present invention.

FIG. 3 is a block diagram including the components of computer system 101, according to one embodiment of the present invention. In some embodiments of the present invention, the components are based upon Intel® E7505 hub-based Chipset. It will be readily understood by those skilled in the art that the configuration described hereinafter is for the purpose of illustration only and not limitative.

The system includes two Intel® Pentium™ Xeon™ DP central processing units (CPU) 301, 302 running at three Gigahertz, which fetch and execute instructions and manipulate data with using Intel®)'s Hyper Threading Technology via an Intel® E7505 533 Megahertz system bus 303 providing connectivity with a Memory Controller Hub (MCH) 304. CPUs 301, 302 are configured with respective high-speed caches 305, 306 comprising at least five hundred and twelve kilobytes, which store frequently-accessed instructions and data to reduce fetching operations from a larger memory 307 via MCH 304. The MCH 304 thus co-ordinates data flow with a larger, dual-channel double-data rate main memory 307, which is between two and four gigabytes in data storage capacity and stores executable programs which, along with data, are received via the bus 303 from a hard disk drive 308 providing non-volatile bulk storage of instructions and data via an Input/Output Controller Hub (ICH) 309. The ICH 309 similarly provides connectivity to DVD-ROM re-writer 105 and ZIP™ drive 107, both of which read and write data and instructions from and to removable data storage media 106, 108. Finally, ICH 309 provides connectivity to USB 2.0 input/output sockets 310, to which the keyboard 103 and mouse 102 are connected, all of which send user input data to system 101.

A graphics card 311 receives graphics data from CPUs 301, 302 along with graphics instructions via MCH 304. The graphics accelerator 311 is preferably coupled to the MCH 304 by means of a direct port 312, such as the direct-attached advanced graphics port 8×(AGP 8×) promulgated by the Intel® Corporation, the bandwidth of which exceeds the bandwidth of bus 303. Preferably, the graphics card 311 includes substantial dedicated graphical processing capabilities, so that the CPUs 301, 302 are not burdened with computationally intensive tasks for which they are not optimised.

Network card 313 provides connectivity to the Ethernet network 109 by processing a plurality of communication protocols, for instance a communication protocol suitable to encode and send and/or receive and decode packets of data over a Gigabit-Ethernet local area network. A sound card 314 is provided which receives sound data from the CPUs 301, 302 along with sound processing instructions, in a manner similar to graphics card 311. Preferably, the sound card 314 includes substantial dedicated digital sound processing capabilities, so that the CPUs 301, 302 are not burdened with computationally intensive tasks for which they are not optimised. Preferably, network card 313 and sound card 314 exchange data with CPUs 301, 302 over system bus 303 by means of Intel®'s PCI-X controller hub 315 administered by MCH 304.

The equipment shown in FIG. 3 constitutes a typical workstation comparable to a high-end IBM™ PC compatible.

Figure 4:
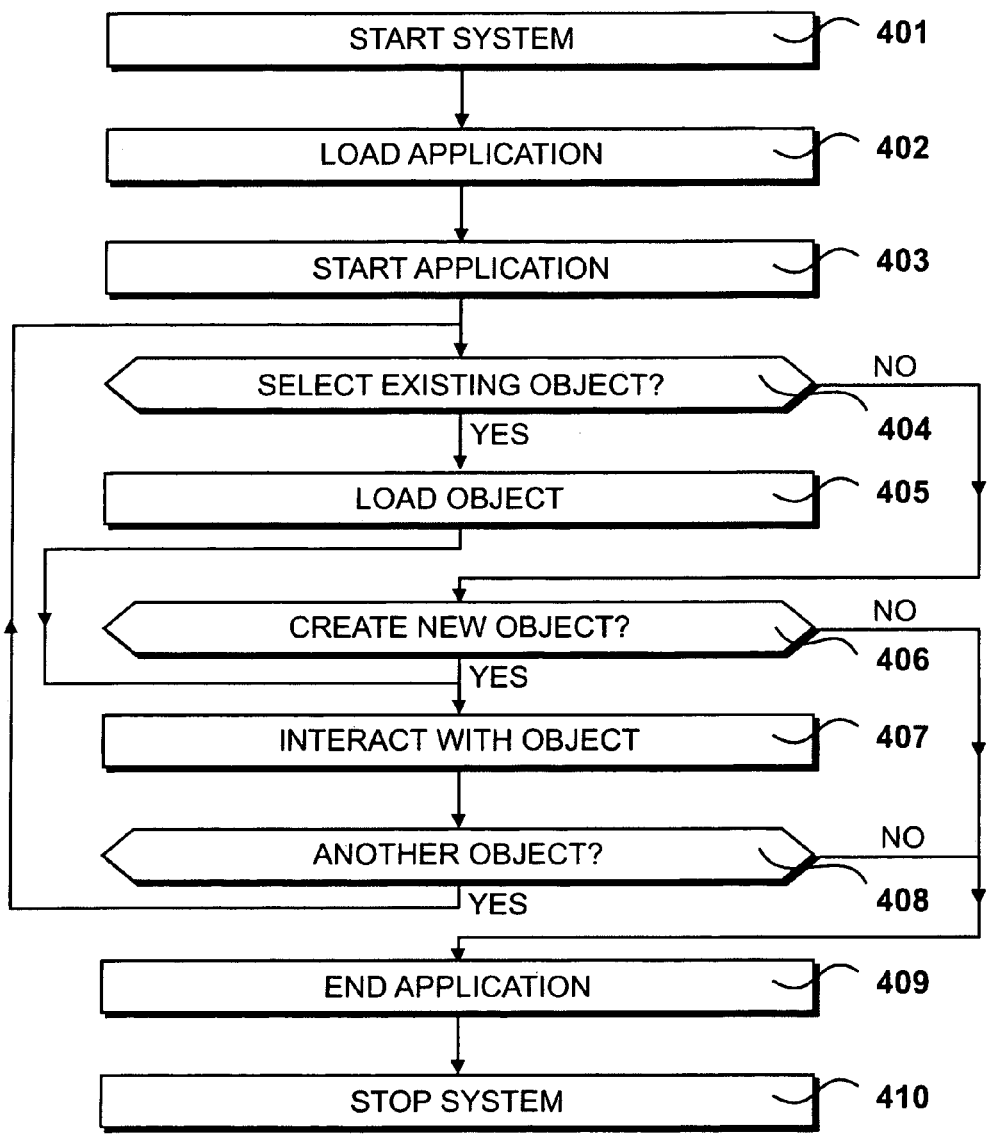
FIG. 4 details the processing steps according to which a user operates the system shown in FIGS. 1 to 3, including a step of interacting with a three-dimensional object such as shown in FIG. 2, according to one embodiment of the present invention.

FIG. 4 illustrates processing steps according to which artist 100 may operate the system shown in FIGS. 1 to 3, according to one embodiment of the present invention.

At step 401, user 100 switches on the system and, at step 402, an instruction set is loaded from hard disk drive 308 or DVD ROM 106 by means of the optical reading device 105 or magnetic disk 108 by means of magnetic reading device 107, or even a network server connected to network 109 and accessed by means of network card 313. Upon completing the loading of step 402 of instructions set into memory 207, CPUs 301, 302 may start processing the set of instructions, also known as an application, at step 403.

At step 404, a question is asked as to whether the user 100 should select an existing 3D object, such as object 208. If the question of step 404 is answered positively, user 100 may then select the existing 3D object for loading into memory 307 at step 405, from hard disk drive 308 or DVD ROM 106 by means of the optical reading device 105 or magnetic disk 108 by means of magnetic reading device 107, or even a network server connected to network 109 and accessed by means of network card 313. Alternatively, if the question of 404 is answered negatively, control proceeds to a second question at step 406, asking whether a new 3D object should be created. If the question of step 406 is answered positively, or upon completing the loading operation of step 405, user 100 may then model the 3D object at step 407, wherein the modeling includes interacting with either the loaded object or the new object for editing its properties.

A question is eventually asked at the next step 408, as to whether the user 100 should select another existing 3D object, such as object 208, or create another 3D object. If the question of step 408 is answered positively, control returns to the question of step 404 for selection of an existing 3D object or, eventually, the question of step 406 for creation of a new 3D object. Alternatively, when either of the respective questions of steps 406 and 408 is answered negatively, signifying that artist 100 does not require the functionality of the application loaded at step 402 anymore, the processing terminates at step 409. Artist 100 is then at liberty to switch off system 101 at step 410.

Figure 5:
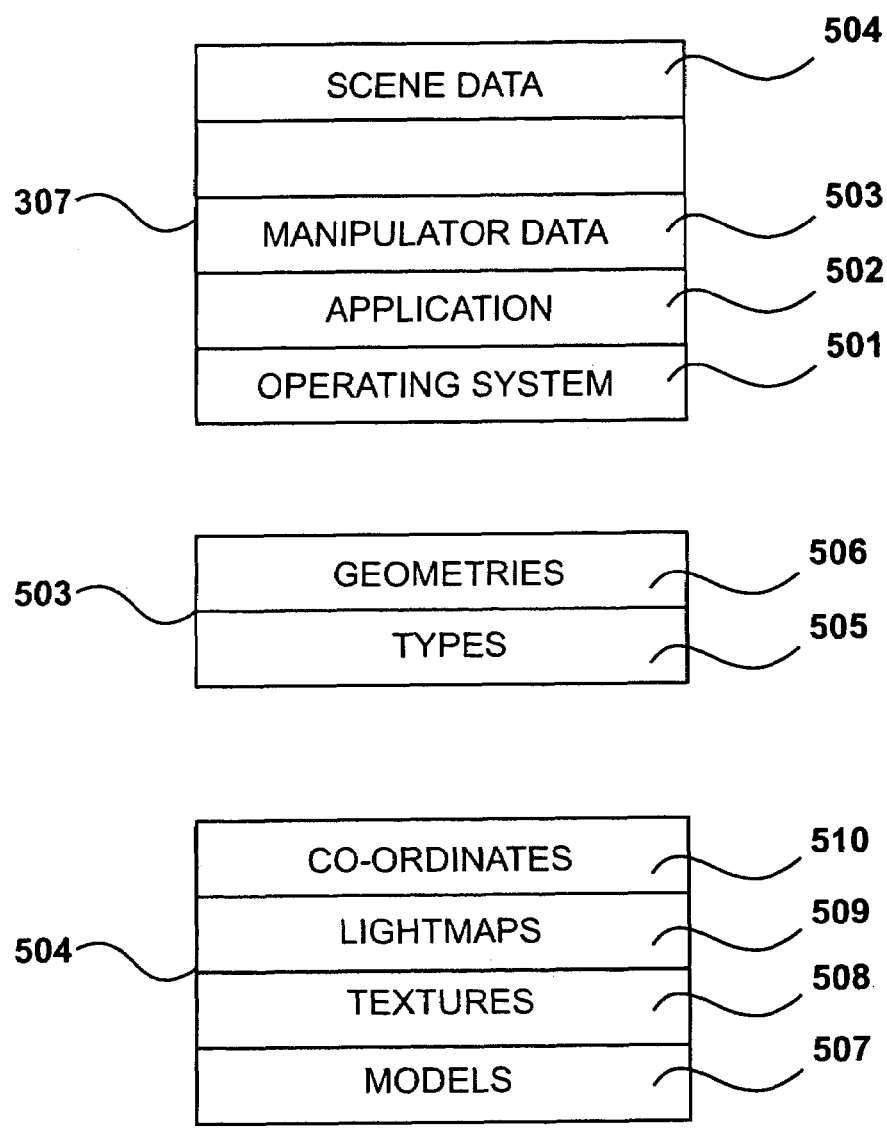
FIG. 5 details the contents of the memory shown in FIG. 3 after performing the step of loading or creating a three-dimensional object shown in FIG. 4, including the application, according to one embodiment of the present invention.

FIG. 5 shows the contents of main memory 307 subsequent to the loading step 405 of an object, or the creation of a new 3D object when the question of step 406 is answered negatively, according to one embodiment of the present invention.

An operating system is shown at 501 which comprises a reduced set of instructions for CPUs 301, 302 the purpose of which is to provide system 101 with basic functionality. Examples of basic functions include for instance access to files stored on hard disk drive 208 or DVD/CD-ROM 106 or ZIP™ disk 108 and management thereof, network connectivity with a network server and the Internet over network 109, interpretation and processing of the input from keyboard 103 and mouse 102. In the example, the operating system is Windows XP™ provided by the Microsoft corporation of Redmond, Wash., but it will be apparent to those skilled in the art that the instructions described herein may be easily adapted to function under different other known operating systems, such as IRIX™ provided by Silicon Graphics Inc. or LINUX, which is freely distributed.

An application is shown at 502 which comprises the instructions loaded at step 402 that enable the image processing system 101 to perform steps 403 to 409 within a viewport 202 displayed on VDU 104. Application 502 comprises instructions for processing by CPUs 301, 302 and may take the form of a software product obtained on a data-carrying medium such as optical disc 106 or magnetic disc 108 or my be downloaded as one or a plurality of data structures by means of network connection 109 from a server or the Internet.

Application data is shown at 503 and 504 and comprises various sets of user input-dependent data and user input-independent data according to which the application shown at 502 processes user input and 3D objects. The application data includes manipulator data 503, which references the various types 505 of manipulators and their respective geometric data 506. The manipulator data 503 may only include a single manipulator type 505 and its respective geometric data 506, but it is useful to provide many different manipulator types 505, each of which possibly includes a plurality of further manipulators, in order to interact within the 3D environment described in FIGS. 1 and 2.

The application data also includes scene data 504, which defines and references the scene attributes and properties as well as various types of 3D objects therein with their respective attributes. A number of examples of scene data 504 are provided for illustrative purposes only and it will be readily apparent to those skilled in the art that the subset described is here limited only for the purpose of clarity. The scene data 504 may include 3D objects 507 loaded according to step 405 or created according to step 407.

The scene data 504 may also include 3D object attributes such as texture files 508 applied by graphics card 311 to polygons such as polygon 204. In the example, scene data 504 also includes lightmaps 509, the purpose of which is to reduce the computational overhead of graphics card 311 when rendering the scene with artificial light sources. Scene data 504 finally include three-dimensional location references 510, the purpose of which is to reference the position of the scene objects edited at step 407 therein in relation to its RCS.

Figure 6:
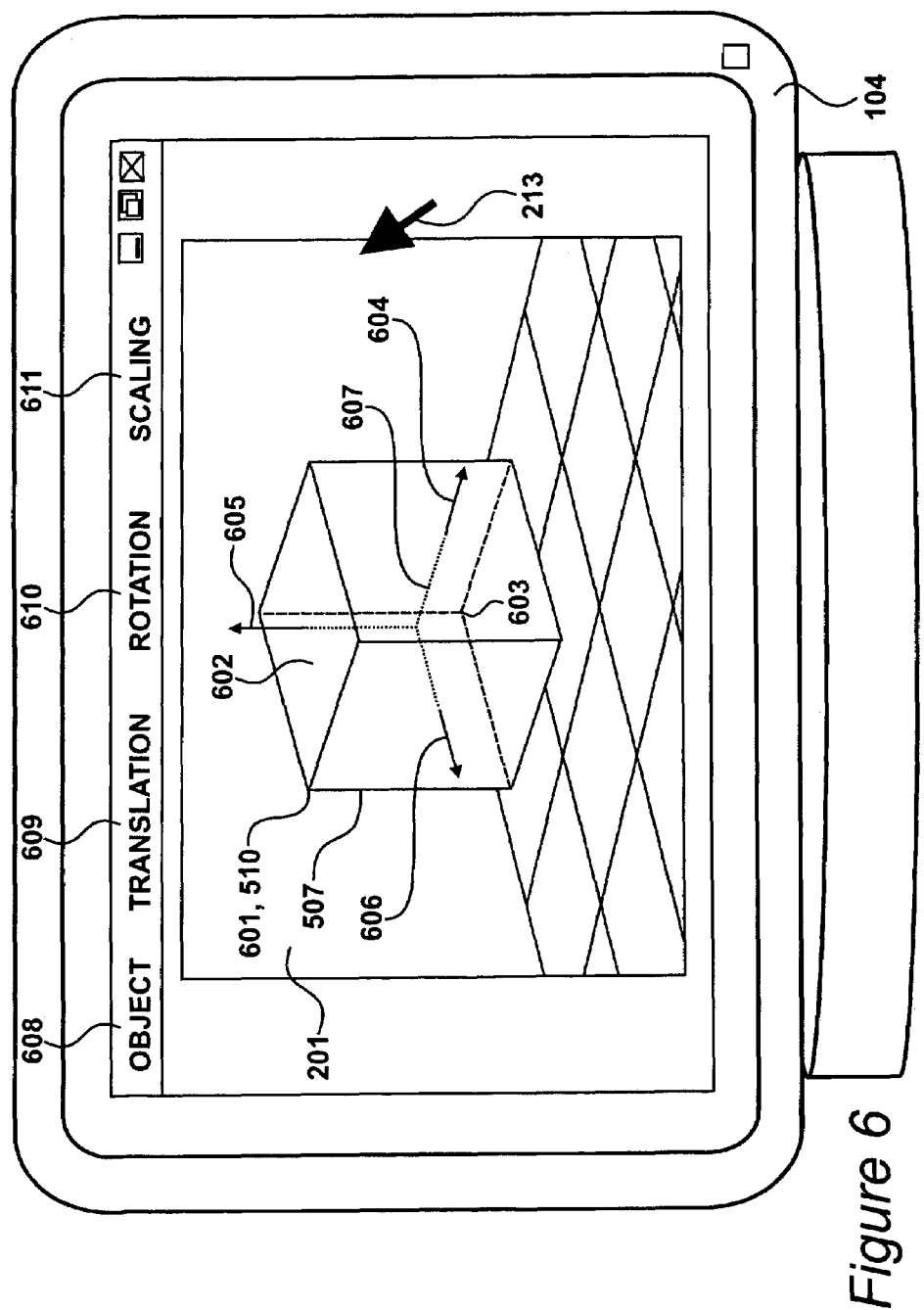
FIG. 6 shows the viewport of FIG. 2 displaying a three-dimensional object shown in FIG. 5 configured with manipulators within the scene shown in FIG. 2, according to one embodiment of the present invention.

FIG. 6 shows viewport 202 displayed on VDU 104, wherein user 100 has created a 3D object 507 according to step 407, according to one embodiment of the present invention.

In FIG. 6 and further figures hereinbelow, viewport 202 is shown as the main portion of the Graphical User Interface (GUI) of application 502 displayed on the Liquid Crystal Display (LCD) component of VDU 104 for the purpose of not unnecessarily obstructing the clarity of the present description, but it will be appreciated by those skilled in the art that the viewport 202 may occupy a significantly smaller portion of the display, particularly in systems configured with a very high display resolution, for instance of 2048 pixels by 1536 pixels.

User 100 performs either step 405 or step 407 by translating pointer 213 over the "object" menu portion 608 of viewport 202 and provides an interrupt command, such as a mouse click or keyboard stroke, to instruct system 101 to load or create an object. If loading an object, upon receiving the interrupt command, system 101 may optionally overlay viewport 202 with a file browser invoking file management functions of OS 501, within which user 100 may then select one of a plurality of files containing either object data 507 or scene data 504 which itself including object data 507, again with effecting a translation of pointer 213 and a subsequent interrupt command. If creating an object, upon receiving the interrupt command, system 101 may optionally generate an empty volume 201, then overlay viewport 202 with a file browser invoking file management functions of OS 501, within which user 100 may then select one of a plurality of files containing basic object data 507. For the purpose of not unnecessarily obscuring the present description, the particular processes required to subsequently model basic object data 507 into, for example, object 208, are not herein described but such processes will be familiar to those skilled in the art.

In the example, user 100 loads a cube object 507 into a new volume 201. The cube is defined by eight vertices 601 and each of the vertices has respective three-dimensional co-ordinates 510 such that application 502 may accurately represent cube 507 within volume 201 with locating the vertices in relation to the scene RCS. Six polygons 602 are thus defined, respectively representing the six faces of cube 507.

Application 502 derives the three-dimensional co-ordinates 510 of pivot 603, wherein pivot 603 is the origin of cube 507 own RCS. Upon user 100 selecting cube 507 within volume 201 by means of translating pointer 213 over any portion of the rasterization thereof within viewport 202, one or a plurality of manipulators may then be selected with which to interact with cube 507. In the example still, user 100 requires to translate cube 507 within volume 201. User 100 thus selects translation-specific manipulators 604, 605, 606, the respective geometries thereof mirror the RCS of cube 507, by way of translating pointer 213 over the "translation" menu portion 609 of viewport 202 and providing an interrupt command, such as a mouse click or keyboard stroke, to instruct system 101 to load the manipulator geometries. User 100 may also select rotation-specific manipulators by way of translating pointer 213 over the "rotation" menu portion 610, or scaling-specific manipulators by way of translating pointer 213 over the "scaling" menu portion 611 of viewport 202, then providing an interrupt command to instruct system 101 to load the respective geometries thereof.

Manipulator 604 is therefore generated as a vector having pivot 603 as its origin and is parallel to the longitudinal axis of cube 507 RCS, manipulator 605 is generated as a vector having pivot 603 as its origin and is parallel to the vertical axis of cube 507 RCS and manipulator 606 is generated as a vector having pivot 603 as its origin and is parallel to the transversal axis of cube 507 RCS.

User 100 may now select any of manipulators 604 to 606 by means of translating pointer 213 over any portion thereof, providing an interrupt command such as a mouse click or a keyboard stroke in order to effect the selection, then provide motion input data along the selected direction, whereby the geometry of cube 507 is transformed within volume 201 by a corresponding translation function such that the position of cube 507 therein the position of cube 507 therein is edited.

In an alternative embodiment of the present invention, the portion 607 of any manipulator extending between the object pivot 603 and intersecting a polygon thereof is represented differently from the portion of the manipulator extending beyond the polygon, in order to convey manipulator depth information to user 100.

Figure 7:
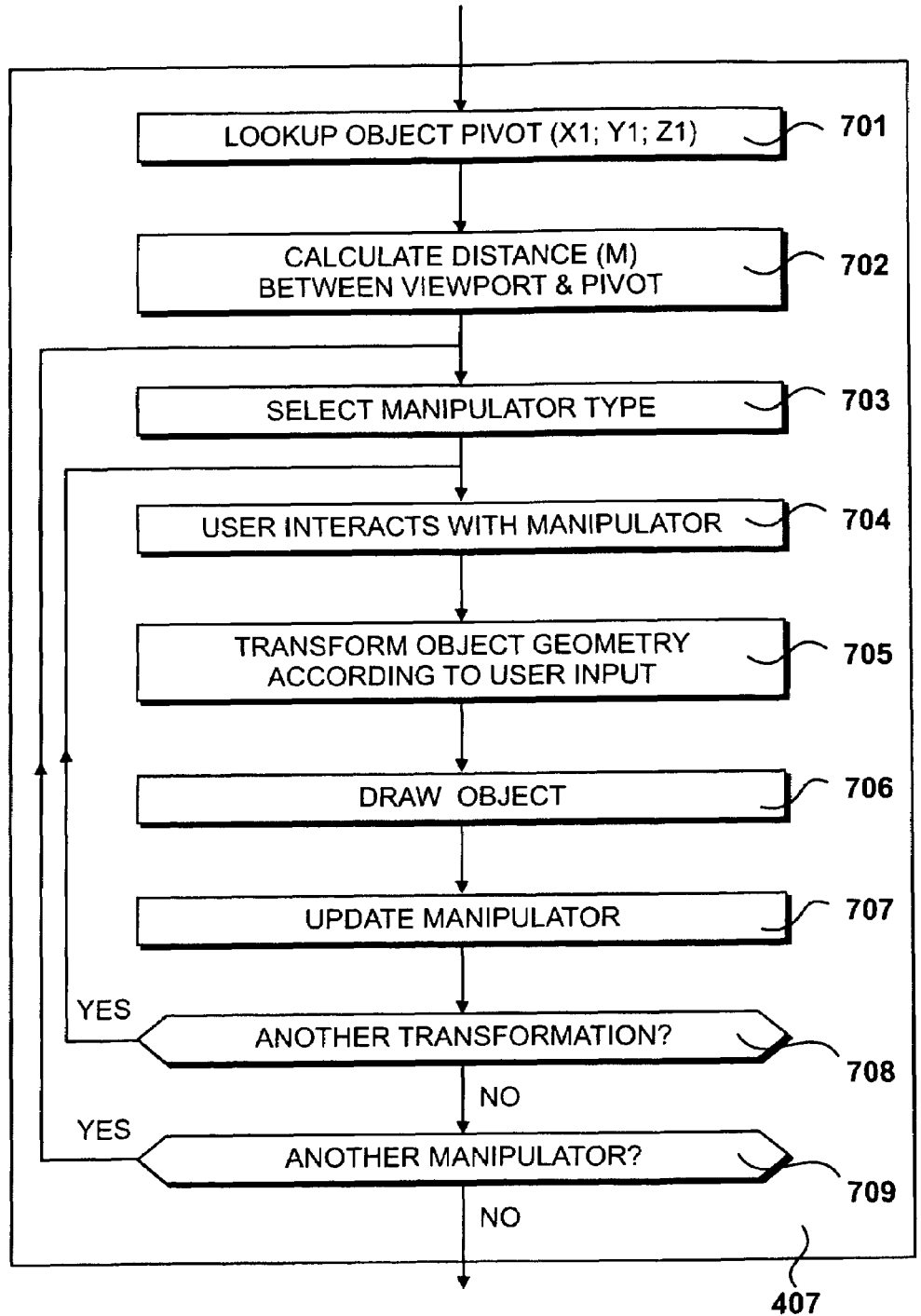
FIG. 7 further details the processing step shown in FIG. 4 according to which a user interacts with the three-dimensional object shown in FIG. 6, including a step of calculating a distance, a step of selecting a manipulator type and a step of repositioning the manipulator, according to one embodiment of the present invention.

FIG. 7 illustrates the step 407 of interacting with the 3D object 507 shown in FIG. 6 by means of selecting manipulators 604, 605, and 606, according to one embodiment of the present invention.

At step 701, application 502 looks-up the three-dimensional co-ordinates (X1; Y1; Z1) of pivot 603 in order to calculate a distance (M) between the origin of the frustrum of viewport 202 and the pivot 603 at the next step 702.

At step 703, user 100 selects a manipulator type 505, which is then generated in relation to the pivot 603 of cube 507, such that user 100 may then input transformation data at the next step 704, as described in FIG. 6. The input data generated by user 100 by means of mouse 102 and/or keyboard 103 at step 704 is processed by application 502 at step 705 in order to transform the geometry of object 507 within volume 201, as also described in FIG. 6, whereby the transformed geometry is subsequently processed for drawing the corresponding transformed object at the next step 706, thus providing visual feedback to user 100. Further to the updating of the object representation in viewport 202, the manipulator is repositioned if required at step 707.

A first question is asked at step 708 as to whether user 100 should effect another transformation of object 507, according to the object's modeling workflow. If the question of step 708 is answered positively, control is returned to the manipulator interacting step 704, such that further transformation may be generated. Alternatively, the question of step 708 is answered negatively, whereby a second question is asked at step 709 as to whether user 100 should select a different manipulator, for instance if the next required transformation within the object modeling workflow requires a different transformation function than the previously selected one. If the question of step 709 is answered positively, control returns to step 703, such that user 100 may select an appropriate object manipulator. Alternatively, if the question of step 709 is answered negatively, control proceeds to the previously described question of step 408.

Figure 8:
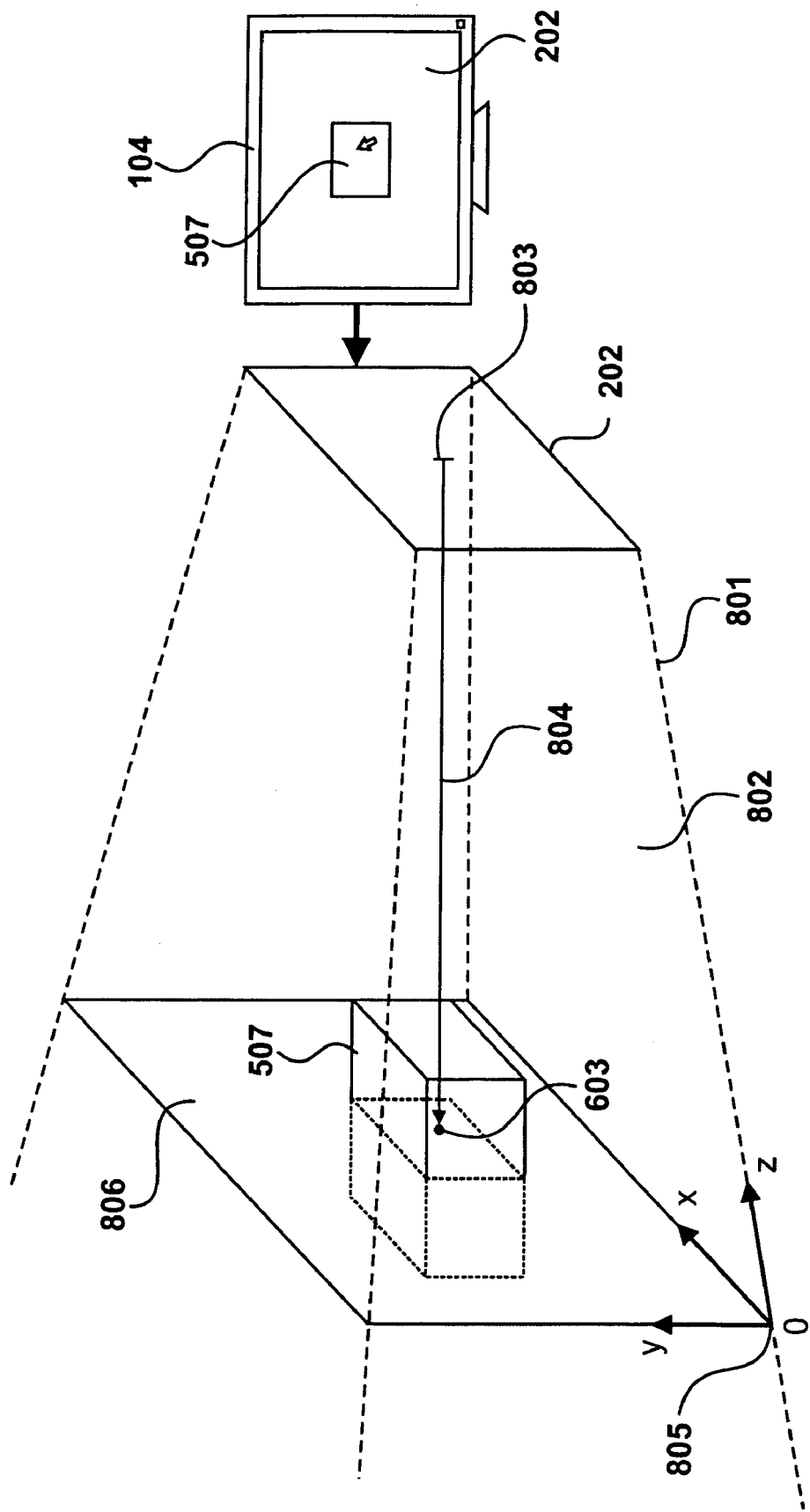
FIG. 8 illustrates the distance which is calculated between the viewport shown in FIGS. 2 and 6 and the geometrical centre of the object shown in FIG. 6 according to the calculating step of FIG. 7, according to one embodiment of the present invention.

FIG. 8 illustrates the distance (M), calculated between the viewport 202 shown in FIGS. 2 and 6 and the object pivot 603 according to step 702, according to one embodiment of the present invention.

Viewport 202 is figuratively represented in perspective, configured with a view frustrum 801 into encompassing a portion 802 of volume 201, wherein the portion 802 includes cube 507. The distance (M) calculated at step 702 is the distance between the origin 803 of the viewing axis 804 extending between viewport 202 and pivot 603.

In effect, the distance is processed by application 502 into a constraint which defines a projected, two-dimensional screen or viewport RCS 805 within volume 201, having an X,Y plane 806 parallel to viewport 202 which intersects pivot 603, thus within which the (Z1) value of pivot 603 is equal zero.

Figure 9:
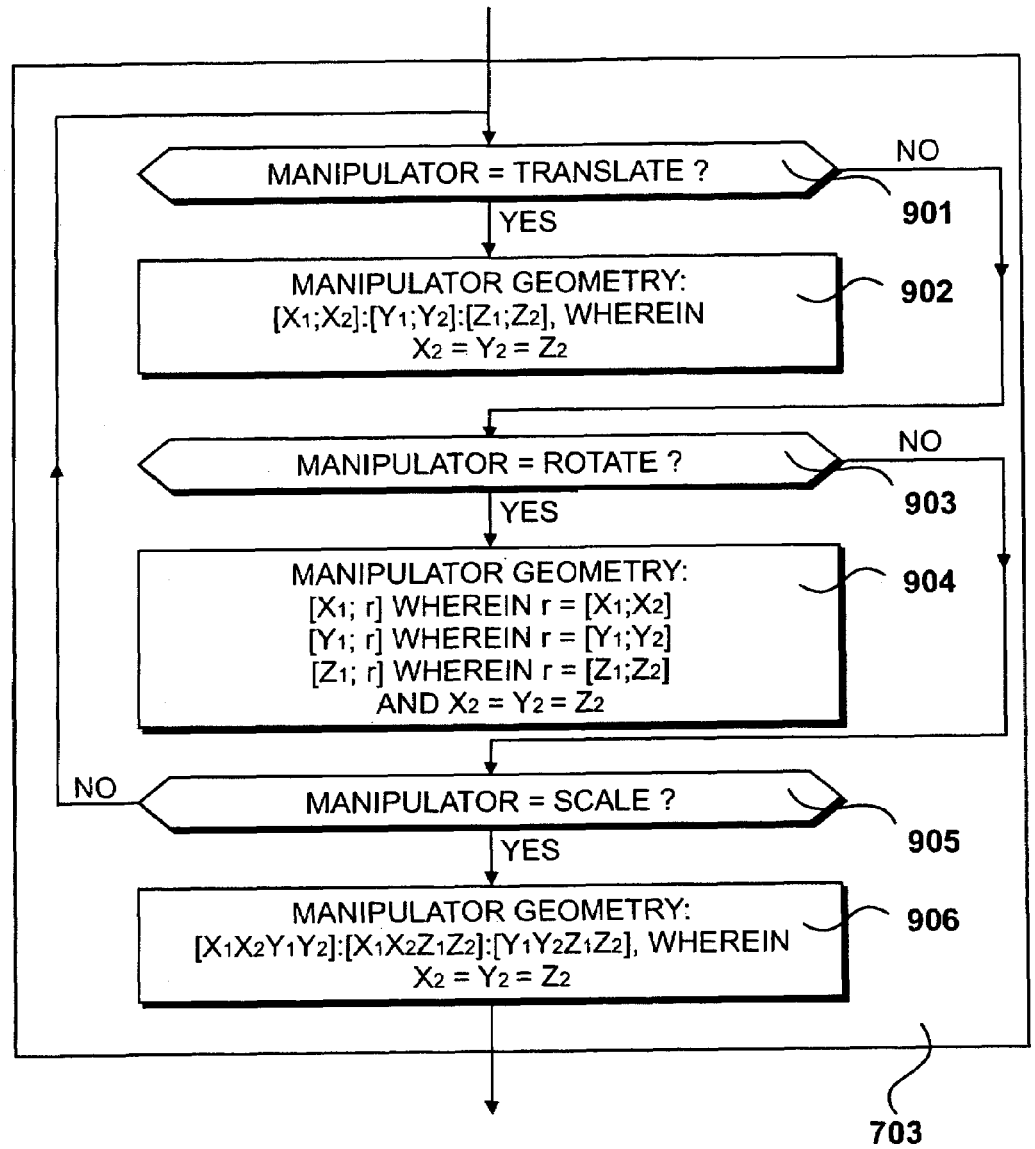
FIG. 9 further details the processing step shown in FIG. 7 according to which a user selects a manipulator type, according to one embodiment of the present invention.

FIG. 9 illustrates the step 703 of selecting one or a plurality of manipulator types, according to one embodiment of the present invention.

A first question is asked at step 901 as to whether user 100 has selected a translation-specific manipulator. If the question of step 901 is answered positively, application 502 fetches the translation manipulator geometry 506 at the next step 902 for the processing and display thereof within viewport 202. In the particular case of object translation, the geometry 506 includes three segment manipulators 604, 605, 606, wherein a first segment is defined by the X1 value of pivot 603 and an arbitrary value X2 along the longitudinal object RCS, a second segment is defined by the Y1 value of pivot 603 and an arbitrary value Y2 along the vertical object RCS and a third segment is defined by the Z1 value of pivot 603 and an arbitrary value Z2 along the viewing axis, wherein the respective X2, Y2 and Z2 values are equal.

Alternatively, the question of step 901 is answered negatively, whereby a second question is asked at step 903 as to whether user 100 has selected a rotation-specific manipulator. If the question of step 901 is answered positively, application 502 fetches the rotation manipulator geometry 506 at the next step 904 for the processing and display thereof within viewport 202. In the particular case of object rotation, the geometry 506 includes three arc manipulators, wherein the arc for rotating the object in the X,Y plane is defined by a centre equal to X1 and a radius equal to [X1;X2], the arc for rotating the object in the Y,Z plane is defined by a centre equal to Y1 and a radius equal to [Y1;Y2], the arc for rotating the object in the X,Z plane is defined by a centre equal to Z1 and a radius equal to [Z1;Z2].

Alternatively, the question of step 903 is answered negatively, whereby a third question is asked at step 905 as to whether user 100 has selected a scaling-specific manipulator. If the question of step 905 is answered positively, application 502 fetches the scaling manipulator geometry 506 at the next step 906 for the processing and display thereof within viewport 202. In the particular case of object scaling, the geometry 506 includes three square manipulators, wherein the square for scaling the object in the X,Y plane is defined by vertices [X1;X2;Y1;Y2], the square for scaling the object in the Y,Z plane is defined by vertices [Y1;Y2;Z1;Z2] and the square for scaling the object in the X,Z plane is defined by vertices [X1;X2;Z1;Z2].

Alternatively, the question of step 905 is answered negatively and control is returned to step 901 to allow user 100 to eventually select an appropriate manipulator in order to complete selecting step 703. Control eventually proceeds to step 704.

Figure 10:
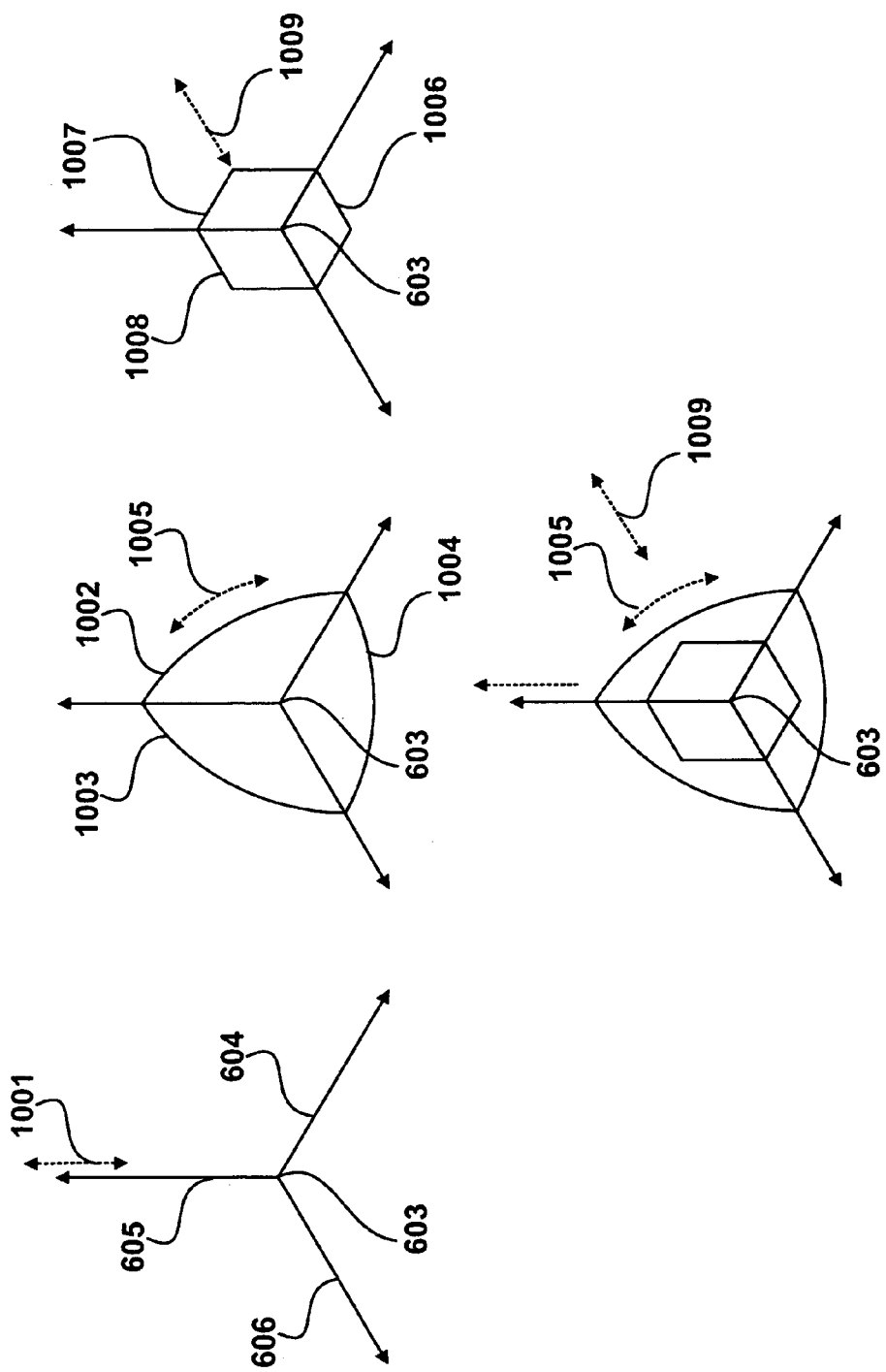
FIG. 10 illustrates various embodiments of manipulators for interacting with three-dimensional object shown in FIGS. 2, 6 and 8, according to one embodiment of the present invention.

FIG. 10 illustrates examples of transformation-specific manipulators described in FIG. 9, according to one embodiment of the present invention.

The translation-specific manipulator shown in FIGS. 2 and 6 and further described at step 902 is shown having pivot 603 as its origin and configured with segment manipulators 604, 605 and 606, the respective geometric data 506 of which is processed according to step 902. User 100 may then select manipulator 605 in order to translate object 507 along the Y axis, as shown at 1001.

A rotation-specific manipulator is shown next, having pivot 603 as its origin and configured with three arc manipulators 1002, 1003 and 1004, the respective geometric data 506 of which is processed according to step 904. Segment manipulators 604, 605 and 606 are shown therewith in order to clarify the respective X,Y; Y,Z and X,Z planes only. Each of the arc manipulators is represented within its respective rotation plane, thus manipulator 1002 is oriented along the X,Y plane, manipulator 1003 is orientated along the Y,Z plane and manipulator 1004 is orientated along the X,Z plane. User 100 may then select manipulator 1002 in order to rotate object 507 about the X,Y plane, as shown at 1005.

A scaling-specific manipulator is shown next, having pivot 603 as its origin and configured with three square manipulators 1006, 1007 and 1008, the respective geometric data 506 of which is processed according to step 906. Segment manipulators 604, 605 and 606 are shown therewith in order to clarify the respective X,Y; Y,Z and X,Z planes only. Each of the square manipulators is represented within its respective scaling plane, thus manipulator 1006 is oriented along the X,Y plane, manipulator 1007 is orientated along the Y,Z plane and manipulator 1008 is orientated along the X,Z plane. User 100 may then select manipulator 1006 in order to scale object 507 along the X,Y plane, as shown at 1009.

A multiple-transformation manipulator is shown next, having pivot 603 as its origin and configured with translation-specific manipulators 604 to 606, rotation-specific manipulators 1002 to 1004 and scaling-specific manipulators 1006 to 1008, such that user 100 may select any of the aforementioned manipulators in viewport 202 by means of pointer 213, in order to effect translation 1001, rotation 1005 or scaling 1009.

Figure 11:
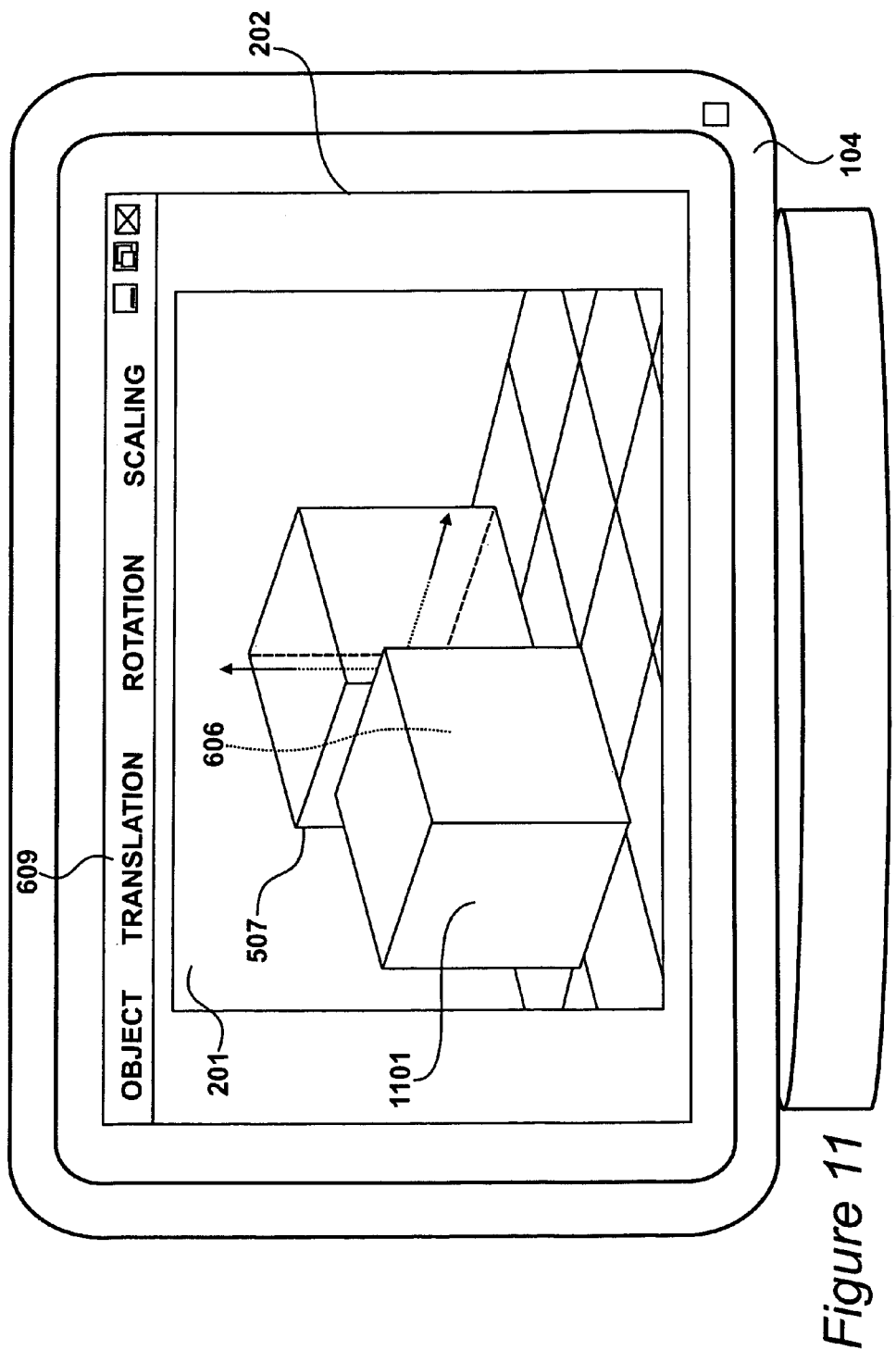
FIG. 11 shows the three-dimensional object of FIGS. 6 and 8 interacted with by the user of FIG. 1 within the viewport of FIGS. 2, 6 and 8, wherein the object is translated within the scene of FIGS. 2, 6 and 8 behind another object, according to one embodiment of the present invention.

FIG. 11 shows the interaction of user 100 with object 507 according to steps 704 to 706, according to one embodiment of the present invention.

In the example, user 100 has selected a translation-specific manipulator at step 703, namely segment manipulator 606 in order to translate cube 507 within volume 201 along the direction of viewing axis 804, e.g. behind the X,Y plane 806. Thus, user 100 has translated pointer 213 over a portion of manipulator 606, effected a mouse click, then imparted an upward motion onto mouse 102.

In the example still, volume 201 includes a plurality of 3D objects, particularly cube object 1101 which becomes located in front of cube 507 along the viewing axis 804 as a result of the above transversal translation. Moreover, cube 1101 is configured by application 502 with an opaque texture 508, which obstructs cube 507 when rasterization takes place.

Figure 12:
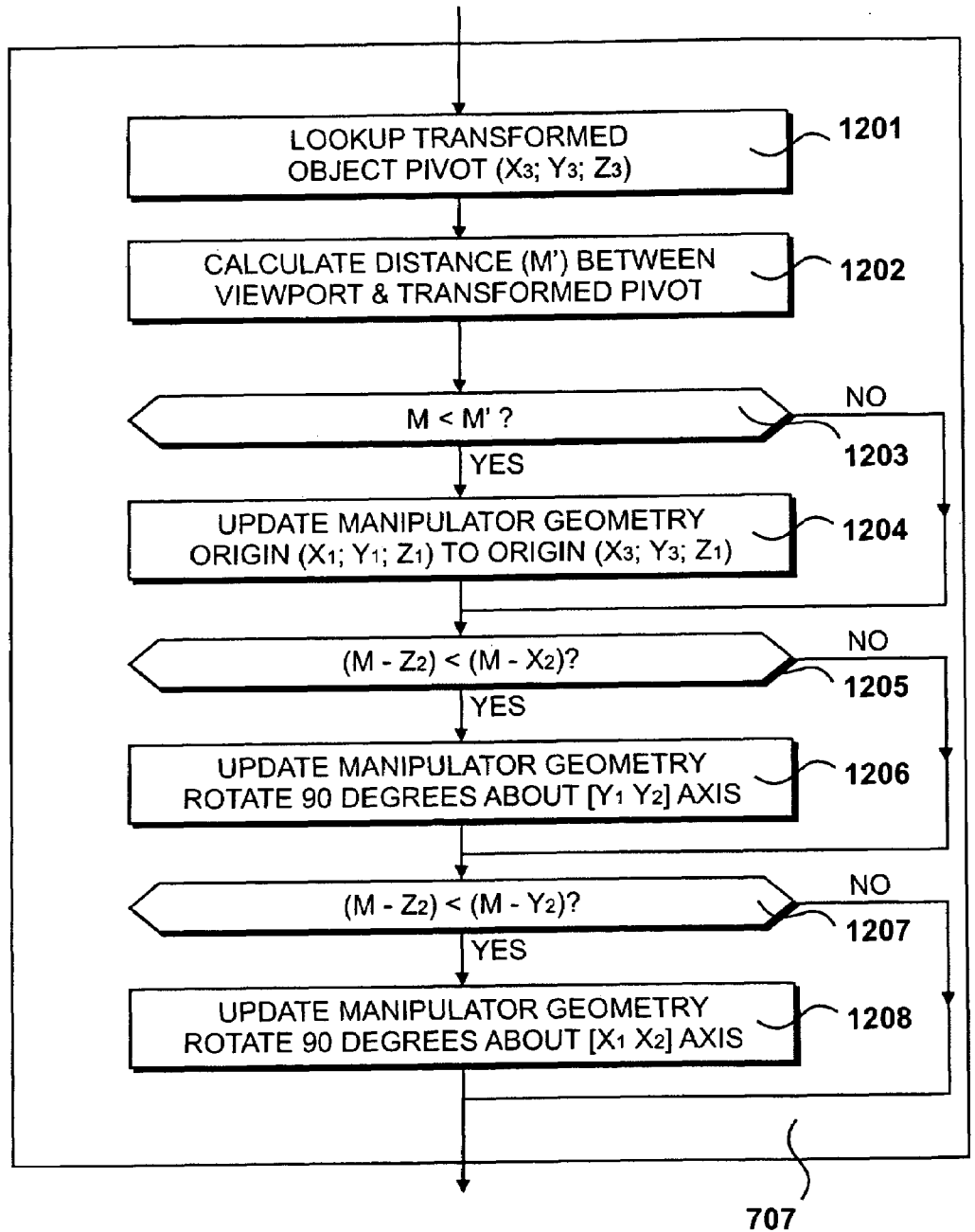
FIG. 12 further details the processing step shown in FIG. 7 according to which the manipulator shown in FIGS. 6 and 11 is updated, according to one embodiment of the present invention.

FIG. 12 describes the step 707 of repositioning the manipulator 604, according to one embodiment of the present invention.

Further to the transformation of object 507 according to user input data at step 705, application 502 looks-up the three-dimensional co-ordinates (X3; Y3; Z3) of transformed pivot 603 at step 1201 in order to calculate a distance (M') between the origin of the frustrum of viewport 202 and the pivot 603 at the next step 1202.

A first question is asked at step 1203 as to whether the distance (M) calculated at step 702 is less than the distance (M') calculated at step 1202. If the question of step 1203 is answered positively, application 502 updates the respective manipulator geometries 902, 904 and/or 906 at step 1204 by replacing pivot values X1 and Y1 with X3 and Y3, but constrains the Z3 value to the initial Z1 value read at step 701. Irrespective of question 1203 being answered positively or negatively, control proceeds to a second a question at step 1205, asking whether the difference between the distance (M) and the Z value of co-ordinate Z2 is less than difference between the distance (M) and the Z value of co-ordinate X2.

If the question of step 1205 is answered positively, application 502 updates the respective manipulator geometries 902, 904 and/or 906 at step 1206 by rotating the transformation-specific manipulator about its Y1,Y2 axis by ninety degrees towards origin 803. Irrespective of question 1205 being answered positively or negatively, control proceeds to a third a question at step 1207, asking whether the difference between the distance (M) and the Z value of co-ordinate Z2 is less than difference between the distance (M) and the Z value of co-ordinate Y2.

If the question of step 1207 is answered positively, application 502 updates the respective manipulator geometries 902, 904 and/or 906 at step 1208 by rotating the transformation-specific manipulator about its X1, X2 axis by ninety degrees towards origin 803.

The transformation-specific manipulator is therefore constantly repositioned for ease of selection, thus ease of object transformation and interaction, within viewport 202 as it is never obscured by other scene objects as a result of translation, or by the object being interacted with itself as a result of rotation or scaling. The manipulator is thus adaptive to the input data provided by the user.

Figure 13:
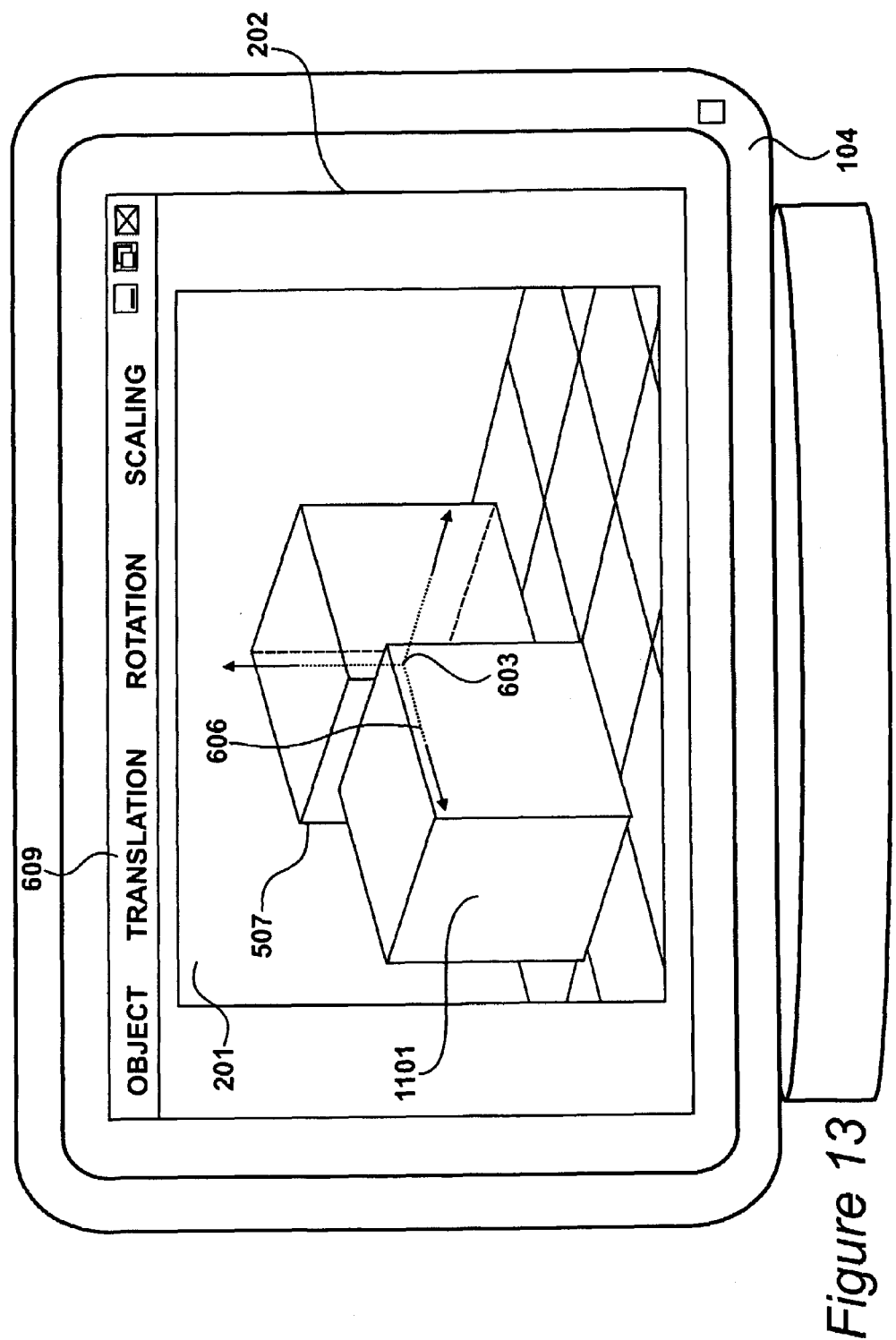
FIG. 13 shows the manipulators of the translated object of FIG. 11 updated within the viewport, according to one embodiment of the present invention.

FIG. 13 shows the repositioning of translation manipulator 606 further to the obstruction of cube 507 by cube 1101 shown in FIG. 11, according to one embodiment of the present invention.

In accordance with the present description, upon user 100 translating cube 507 behind cube 1101 whereby cube 507 is visually obstructed, application 502 calculates the distance (M') between the transformed pivot 603 and viewport 202. Having reference to the description of FIGS. 8 and 12, the question of step 1203 is answered positively as the distance (M') derived from the respective co-ordinates (X3;Y3;Z3) of the transformed pivot is greater than the distance (M) derived from the original co-ordinates (X1;Y1;Z1).

Thus, according to step 1204, application 502 updates the respective geometries of segment manipulators 604, 605 and 606, wherein X1 and Y1 values are updated with X3 and Y3 values respectively but the Z3 value update is ignored for the purpose of representing the transformation-specific manipulator, such that the segment manipulator 606 and pivot point 603 are now visible and thus accessible for selection to user 100, despite the visual obstruction of cube 507 by cube 1101 within viewport 202.

Figure 14:
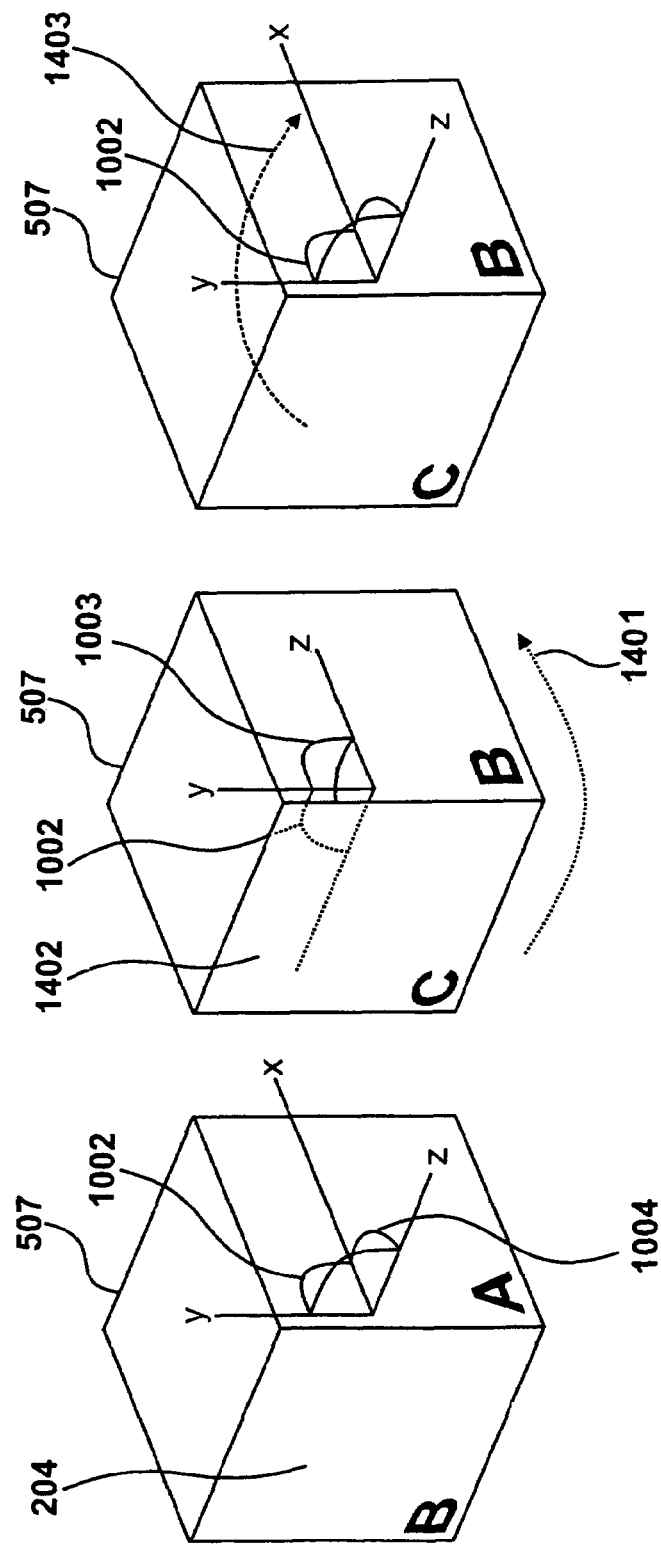
FIG. 14 illustrates an alternative embodiment of the present invention in which the rotation manipulators of FIG. 10 are updated following a rotation of the object of FIGS. 6, 8, 11 and 13, according to one embodiment of the present invention.

FIG. 14 shows the repositioning of rotation manipulators 1002, 1003 and 1004 shown in FIG. 10 by way of a sequence of transformations, according to one embodiment of the present invention.

In accordance with the present description, upon user 100 rotating cube 507 about its vertical Y axis as shown at 1401 by means of translating pointer 213 over rotation manipulator 1004, effecting a mouse click then providing motion input data with translating mouse 102 to the right, the rotation specific manipulator becomes visually obstructed by cube 507 itself, especially if one or more polygons 204 of the cube are configured with a texture 508 as shown at 1402.

However, the difference between the distance (M) and the Z value of co-ordinate Z2 is less than difference between the distance (M) and the Z value of co-ordinate X2. Thus, in accordance with the description of steps 1205, 1206, the question of step 1205 is answered positively and application 502 updates the respective manipulator geometries 1002, 1003 and 1004 at step 1206 by rotating the transformation-specific manipulator about its Y1,Y2 axis by ninety degrees towards origin 803, as shown at 1403.

The portion of arc manipulator 1002 is now visible and thus accessible for selection to user 100 within viewport 202, despite the initial obstruction thereof by the texture shown at 1402.

Figure 15:
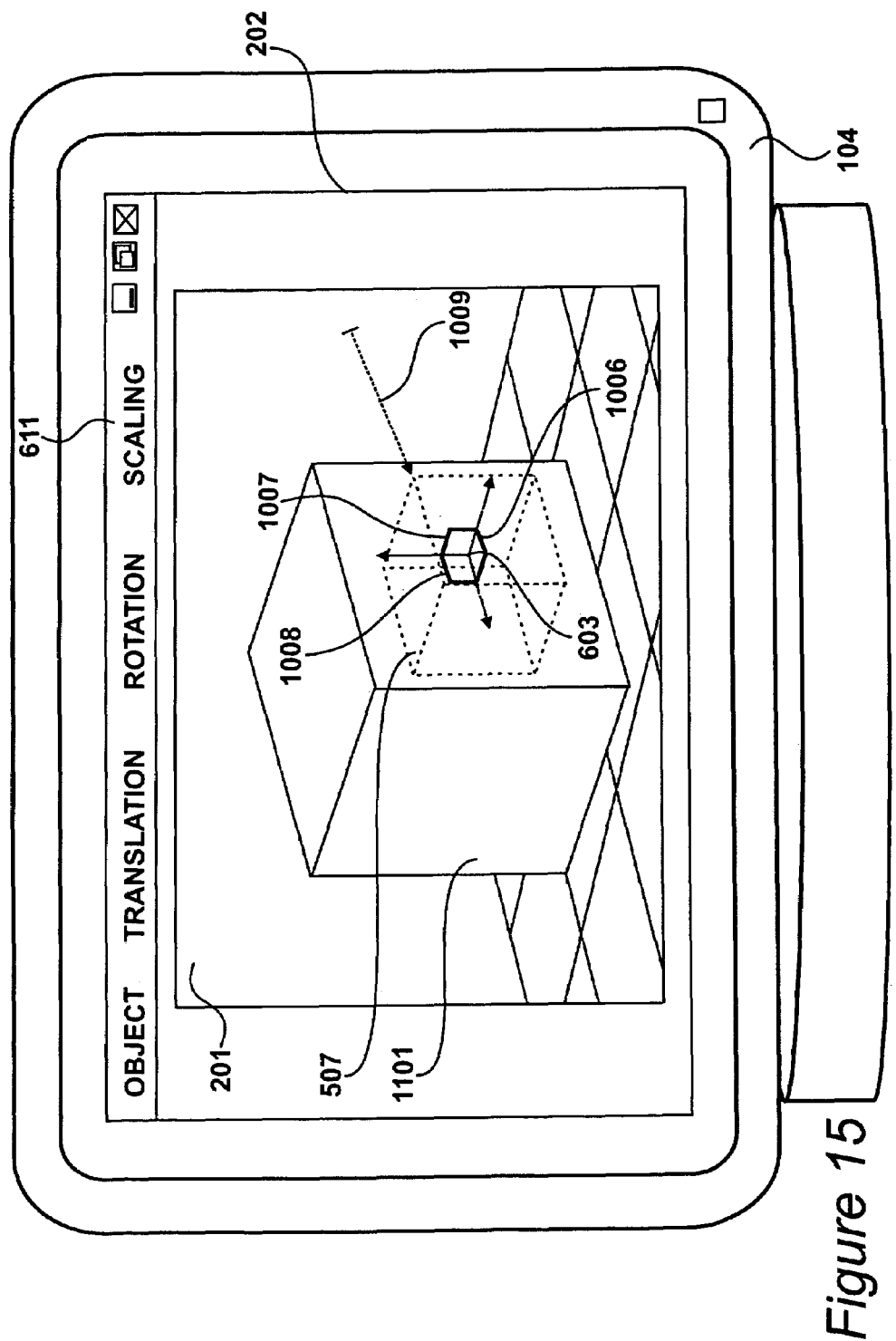
FIG. 15 illustrates an alternative embodiment of the present invention in which the scaling manipulators of FIG. 10 are updated following a scaling of the object of FIGS. 6, 8, 11 and 13 behind the second object shown in FIGS. 11 and 13, according to one embodiment of the present invention.

FIG. 15 shows the repositioning of scaling manipulators 1006, 1007 and 1008, according to one embodiment of the present invention, further to the obstruction of cube 507 by cube 1101 resulting from the scaling illustrated in FIG. 13.

In accordance with the present description, upon user 100 scaling cube 507 along the X,Y plane as shown at 1009 by means of translating pointer 213 over scaling manipulator 1006, effecting a mouse click then providing motion input data with translating mouse 102 to the left, the scaling-specific manipulator becomes visually obstructed by cube 1101, as was the case with translating cube 507 behind cube 1101 shown in FIGS. 11 and 13. In the example, cube 507 is totally obstructed for the purpose of clarity of description, but it will be readily apparent to those skilled in the art that a partial obstruction thereof would similarly fall within the teachings of the present description.

Having reference to the description of FIGS. 8 and 12, the question of step 1203 is answered positively as the distance (M') derived from the respective co-ordinates (X3;Y3;Z3) of the scaled pivot is greater than the distance (M) derived from the original co-ordinates (X1;Y1;Z1), since the scaling of cube 507 has translated pivot 603 back along the viewing axis 804.

Thus, according to step 1204, application 502 updates the respective geometries of scaling manipulators 1006, 1007 and 1008, wherein X1 and Y1 values are updated with X3 and Y3 values respectively but the Z3 value update is ignored for the purpose of representing the transformation-specific manipulator, such that the scaling manipulators 1006, 1007 and 1008 and pivot point 603 are now visible and thus accessible for selection to user 100, despite the total visual obstruction of cube 507 by cube 1101 within viewport 202.

Figure 16:
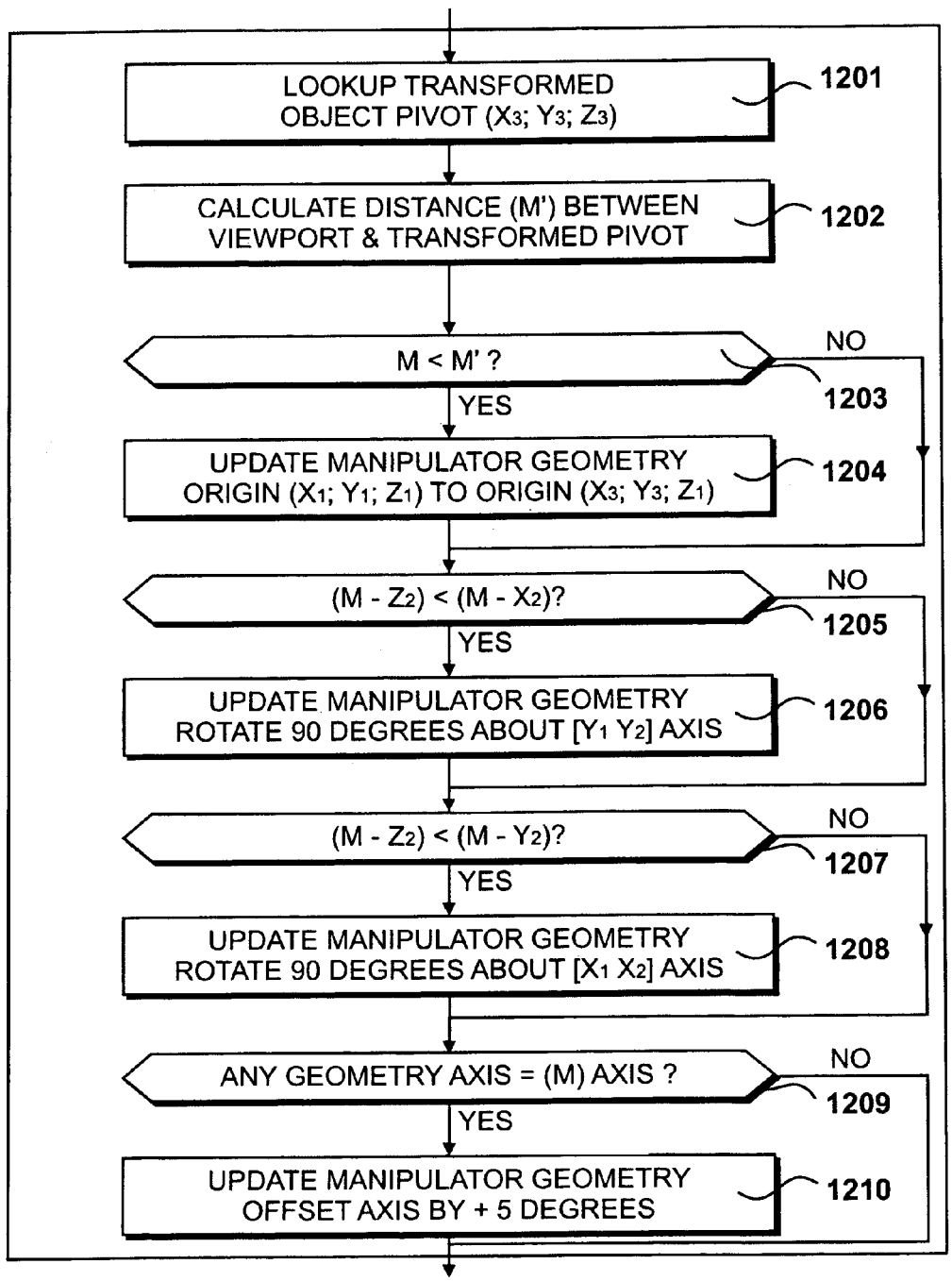
FIG. 16 details an alternative embodiment, in which the processing step shown in FIG. 12 according to which the manipulator is updated further includes a step of offsetting a portion of the manipulators, according to one embodiment of the present invention.

FIG. 16 illustrates an alternate embodiment of the step 707 of repositioning the manipulator.

Further to the transformation of object 507 according to user input data at step 705, application 502 looks-up the three-dimensional co-ordinates (X3; Y3; Z3) of transformed pivot 603 at step 1601 in order to calculate a distance (M') between the origin of the frustrum of viewport 202 and the pivot 603 at the next step 1602.

A first question is asked at step 1603 as to whether the distance (M) calculated at step 702 is less than the distance (M') calculated at step 1602. If the question of step 1603 is answered positively, application 502 updates the respective manipulator geometries 902, 904 and/or 906 at step 1604 by replacing pivot values X1 and Y1 with X3 and Y3, but constrains the Z3 value to the initial Z1 value read at step 701. Irrespective of question 1603 being answered positively or negatively, control proceeds to a second a question at step 1605, asking whether the difference between the distance (M) and the Z value of co-ordinate Z2 is less than difference between the distance (M) and the Z value of co-ordinate X2.

If the question of step 1605 is answered positively, application 502 updates the respective manipulator geometries 902, 904 and/or 906 at step 1606 by rotating the transformation-specific manipulator about its Y1,Y2 axis by ninety degrees towards origin 803. Irrespective of question 1605 being answered positively or negatively, control proceeds to a third a question at step 1607, asking whether the difference between the distance (M) and the Z value of co-ordinate Z2 is less than difference between the distance (M) and the Z value of co-ordinate Y2.

If the question of step 1607 is answered positively, application 502 updates the respective manipulator geometries 902, 904 and/or 906 at step 1608 by rotating the transformation-specific manipulator about its X1, X2 axis by ninety degrees towards origin 803.

Irrespective of question 1607 being answered positively or negatively, control proceeds to a fourth question at step 1609, asking whether the any portion of the manipulator geometry coincides with the viewing axis 804, for instance the transversal segment manipulator 606, the rotation arc manipulator 1003 or the scaling square manipulator 1007 is strictly perpendicular to the viewing axis 804 such that it is not visible to user 100.

If the question of step 1609 is answered positively, application 502 updates the respective manipulator geometries 902, 904 and/or 906 at step 1610 by offsetting the transformation-specific manipulator by five or more degrees away from origin 803, relative to the viewing axis 804. The transformation-specific manipulator is therefore again constantly repositioned for ease of selection, thus ease of object transformation and interaction, within viewport 202 as it is never obscured by other scene objects as a result of translation, or by the object being interacted with itself as a result of rotation or scaling, or by its own geometry.

Figure 17:
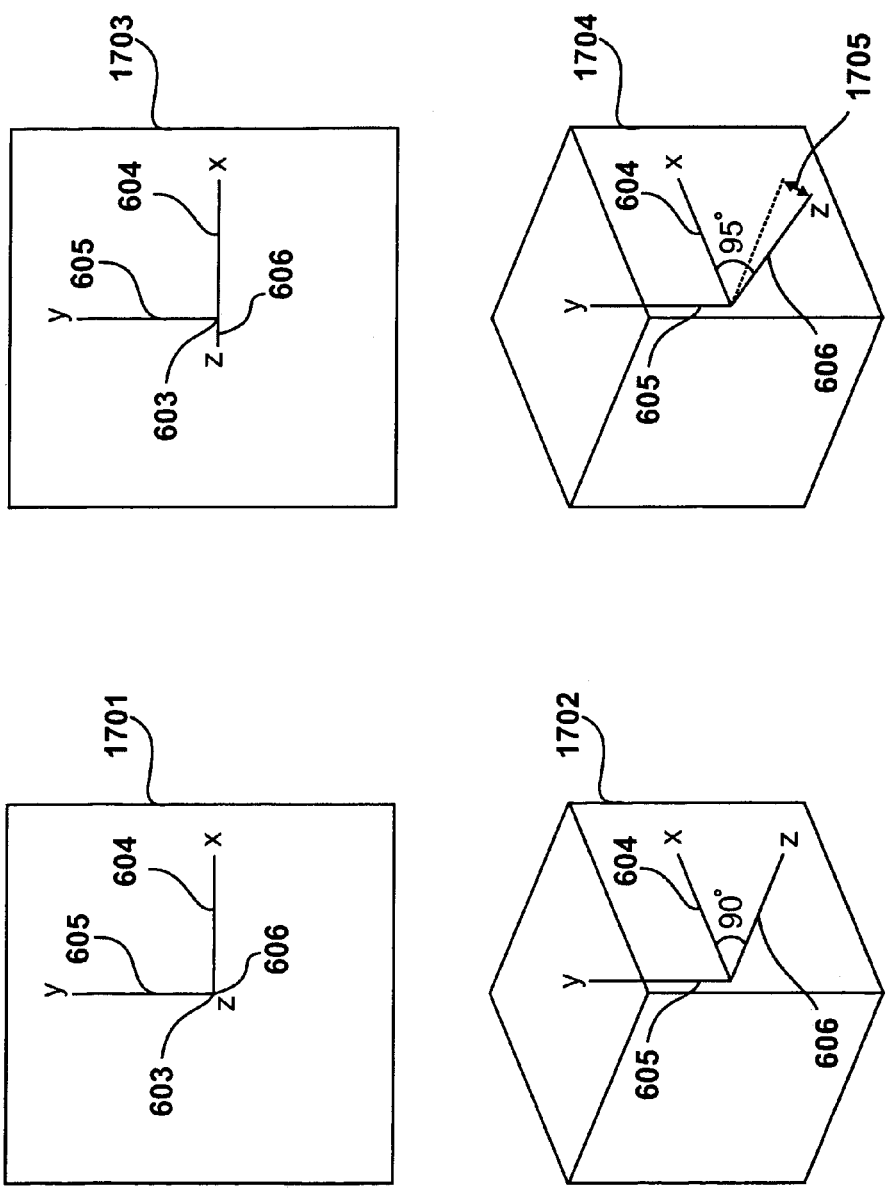
FIG. 17 illustrates the alternative embodiment detailed in FIG. 16, in which a portion of the manipulators of FIG. 6 is offset, according to one embodiment of the present invention.

FIG. 17 shows the repositioning of translation manipulator 606 according to the alternative embodiment described in FIG. 16, according to one embodiment of the present invention.

Cube 507 is shown as a cross-section at 1701, which is strictly parallel to viewport 202 and strictly perpendicular to viewing axis 804. Upon user 100 selecting a translation-specific manipulator, manipulators 604, 605 and 606 are displayed within viewport 202 with pivot 603 as their respective origin because of the particular pose of cube 507, the transversal translation manipulator 606 coinciding with the viewing axis 804 and is thus hardly visible, i.e. accessible for selection, to user 100 in viewport 202. Indeed, if cube 507 was configured with any other pose, for instance as shown at 1702, it would be much easier for user 100 to select any of the translation segment manipulators, including segment manipulator 606.

In accordance with the alternative embodiment of the present invention described in FIG. 16 however, the question of step 1209 is answered positively in the situation depicted at 1701 such that, at step 1210, application 502 updates the geometry of segment manipulator 606 and offsets the [X1, X2] segment by five degrees from the viewing axis 804 as shown at 1703, such that its representation within viewport 202 becomes visible and thus much easier to select by user 100.

A perspective view of the offset manipulator shown at 1703 is shown at 1704, wherein the five degrees offset generates an offset distance 1705 projected as segment manipulator 606 by the rasterization thereof onto viewport 202.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer readable medium storing instructions for causing a computer to reposition a manipulator in a viewport, by performing the steps of:
    drawing an object in the viewport, the object configured with a pivot that is positioned at the geometric center of the object;
    drawing the manipulator in the viewport;
    transforming the object responsive to user input to produce a transformed object;
    transforming the manipulator responsive to user input to produce a transformed manipulator; and
    after the transformation of the object and the transformation of the manipulator, and based on a constraint, automatically repositioning the transformed manipulator independently of the transformed object to produce a repositioned manipulator that is not obscured by the transformed object.

2. The computer readable medium of claim 1, wherein the manipulator comprises a geometry representing a three-dimensional geometry of the object.

3. The computer readable medium of claim 2, wherein an origin of the manipulator geometry is coincident with the pivot of the object.

4. The computer readable medium of claim 2, wherein the repositioning includes rotating the transformed manipulator geometry dependent on the constraint.

5. The computer readable medium of claim 2, wherein the repositioning includes offsetting the transformed manipulator geometry from a view axis when an axis of the transformed manipulator geometry coincides with the view axis.

6. The computer readable medium of claim 1, wherein the manipulator is selected from the group comprising a translation-specific manipulator, a rotation-specific manipulator, and a scaling-specific manipulator.

7. The computer readable medium of claim 1, wherein the manipulator is a multiple-transformation manipulator.

8. The computer readable medium of claim 1, further comprising the step of determining the constraint based on a first distance and a second distance, wherein the first distance represents a measurement between the pivot of the object and an origin of the viewport and the second distance represents a measurement between the pivot of the transformed object and the origin of the viewport.

9. The computer readable medium of claim 1, wherein a first coordinate of the manipulator and a first coordinate of the repositioned manipulator are equal and a second coordinate of the manipulator and a second coordinate of the repositioned manipulator are not equal.

10. The computer readable medium of claim 1, wherein a first portion of the manipulator extending between the pivot of the object and intersecting a polygon of the object, is displayed differently than a second portion of the manipulator, the second portion extending beyond the polygon of the object.

11. A method of repositioning a manipulator in a viewport, comprising:
   drawing an object configured with a pivot that is positioned at the geometric center of the object;
   drawing the manipulator in the viewport;
   transforming the object responsive to user input to produce a transformed object;
   transforming the manipulator responsive to user input to produce a transformed manipulator; and
   after the transformation of the object and the transformation of the manipulator, and based on a constraint, automatically repositioning the transformed manipulator independently of the transformed object to produce a repositioned manipulator that is not obscured by the transformed object.

12. The method of claim 11, further comprising the step of determining the constraint based on a first distance and a second distance, wherein the first distance represents a measurement between the pivot of the object and an origin of the viewport and the second distance represents a measurement between the pivot of the transformed object and the origin of the viewport.

13. The method of claim 11, wherein a first coordinate of the manipulator and a first coordinate of the repositioned manipulator are equal and a second coordinate of the manipulator and a second coordinate of the repositioned manipulator are not equal.

14. The method of claim 11, wherein the repositioning includes rotating the transformed manipulator geometry dependent on the constraint.

15. The method of claim 11, wherein a first portion of the manipulator, the first portion extending between the pivot of the object and intersecting a polygon of the object, is displayed differently than a second portion of the manipulator extending beyond the polygon of the object.

16. A system for repositioning a manipulator in a viewport, the system comprising:
   means for drawing the manipulator and the object in a viewport;
   means for transforming the object responsive to user input to produce a transformed object;
   means for determining a constraint based on a position of the object and a position of the transformed object;
   means for transforming the manipulator responsive to user input to produce a transformed manipulator; and
   means for, after the transformation of the object and the transformation of the manipulator, and based on the constraint, automatically repositioning the transformed manipulator independently of the transformed object.

17. The system of claim 16, further comprising means for drawing the repositioned manipulator and the transformed object in the viewport.

18. The system of claim 16, wherein the manipulator comprises a geometry representing a three-dimensional geometry of the object.

19. The system of claim 16, wherein the manipulator is at least one of a translation-specific manipulator, a rotation-specific manipulator, and a scaling-specific manipulator.

20. The system of claim 16, wherein the constraint is determined based on a first distance and a second distance, wherein the first distance represents a measurement between a pivot of the object and an origin of the viewport and the second distance represents a measurement between the pivot of the transformed object and the origin of the viewport.

* * * * *